United States Patent
Lee et al.

(10) Patent No.: US 9,136,894 B2
(45) Date of Patent: Sep. 15, 2015

(54) HYBRID PLATFORM FOR A SOFTWARE DEFINED RADIO

(75) Inventors: Jeongkeun Lee, Mountain View, CA (US); Eugene Songyou Chai, Ann Arbor, MI (US); Sung-Ju Lee, Redwood City, CA (US); Raul Hernan Etkin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 13/460,351

(22) Filed: Apr. 30, 2012

(65) Prior Publication Data

US 2013/0287070 A1    Oct. 31, 2013

(51) Int. Cl.
*H04B 1/38* (2006.01)
*H04L 5/16* (2006.01)
*H04B 1/00* (2006.01)

(52) U.S. Cl.
CPC .............. *H04B 1/38* (2013.01); *H04B 1/0003* (2013.01)

(58) Field of Classification Search
CPC ............................ H04L 25/061; H04L 25/062
USPC ........................................ 375/219; 455/115.1
See application file for complete search history.

(56) References Cited

PUBLICATIONS

D. Katabi, S. Gollakota, and S. D. Perli, "Interference alignment and cancellation," SIGCOMM CCR, 2009 (12 pages).
G. J. Minden et al., "KUAR : A Flexible Software-Defined Radio Development Platform," New Frontiers in Dynamic Spectrum Access Networks, 2007 (12 pages).
K. Tan et al., "Sora: High performance software radio using general purpose multi-core," in NSDI, 2009 (27 pages).
K. Tan, H. Liu, J. Fang, W. Wang, J. Zhang, M. Chen, and G. Voelker, "SAM: enabling practical spatial multiple access in wireless LAN," in Mobicom, 2009 (12 pages).
M. C. Ng, K. E. Fleming, M. Vutukuru, and S. Gross, "Airblue : A System for Cross-Layer Wireless Protocol Development," in ACM/IEEE Symposium on Architectures for Networking and Communications Systems, 2010 (11 pages).
Miljanic et al., The WINLAB Network Centric Cognitive Radio Hardware Platform WiNC2R, Publisher: IEEE, 2007, pp. 155-160.
P. Murphy and A. Sabharwal, "Design of warp: A wireless open-access research platform," Proceedings of EUSIPCO, 2006 (5 pages).
T. R. M. and A. A. Frohlich, "HyRA: A Software-defined Radio Architecture for Wireless Embedded Systems," in ICN 2011 : The Tenth International Conference on Networks, 2011 (11 pages).
Y. Lin et al., "SODA: A low-power architecture for software radio," in ACM SIGARCH Computer Architecture News, 2006 (12 pages).

*Primary Examiner* — Tanmay Shah
(74) *Attorney, Agent, or Firm* — Dickinson Wright

(57) ABSTRACT

A hybrid platform for a software defined radio (SDR) includes a receive/transmit antenna, a radio frequency (RF) frontend, a baseband processor, and a SDR positioned along a signal path that couples the antenna, the RF frontend, and the baseband processor. The SDR includes a transmit processing chain, a receive processing chain, and a FPGA that includes control logic to reduce distortion caused by signal transmission within the SDR.

12 Claims, 3 Drawing Sheets

HYBRID PLATFORM FOR A SOFTWARE DEFINED RADIO

BACKGROUND

A radio is a device that wirelessly transmits or receives signals in the radio frequency (RF) part of the electromagnetic spectrum to facilitate the transfer of information. Today, radios exist in a multitude of items such as cell phones, computers, car door openers, vehicles, and televisions.

Traditional hardware based radios limit cross-functionality and can only be modified through physical intervention. This results in higher production costs and minimal flexibility in supporting multiple wireless communication standards. By contrast, software defined radio (SDR) technology provides an efficient and comparatively inexpensive solution to this problem, allowing multi-mode, multi-band and/or multi-functional radios that can be enhanced using software upgrades.

SDR defines a collection of hardware and software technologies where some or all of the radio's operating functions (also referred to as physical layer (PHY) processing) are implemented through modifiable software or firmware operating on programmable processing technologies. These devices include field programmable gate arrays (FPGA), digital signal processors (DSP), general purpose processors (GPP), programmable System on Chip (SoC) or other application specific programmable processors. The use of these technologies allows new wireless features and capabilities to be added to existing radio systems without requiring new hardware.

Thus, a SDR is a radio whose components, which in a hardware-based radio would have been implemented in hardware (e.g. mixers, filters, amplifiers, modulators/demodulators, detectors, etc.), are instead implemented by means of software on a personal computer or embedded computing devices. Software defined radios find use in the afore-mentioned personal computer and a number of other portable devices. A basic SDR may include a personal computer equipped with analog-to-digital converter, preceded by a radio frequency (RF) frontend. Significant amounts of signal processing are handled by a programmed general-purpose processor, rather than being done in special-purpose hardware. Such a design produces a radio that can receive and transmit widely different wireless communication protocols based solely on the software used.

DESCRIPTION OF THE DRAWINGS

The detailed description refers to the following drawings in which like numerals refer to like items, and in which.

DETAILED DESCRIPTION

Figure 1:
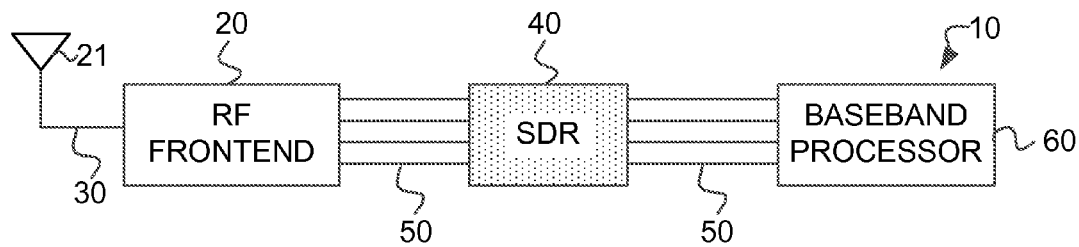
FIGS. 1-6 illustrate embodiments of a hybrid software defined radio platform.

Software defined radios (SDRs) suffer from a complicated protocol development process and poor integration with existing wireless standards. This is because the entire PHY/MAC (physical/media access control) protocol for a SDR has to be implemented and tuned for the specific SDR device. However, SDR PHY designs often require the same basic digital signal processing building blocks that already exist in application specific integrated circuits (ASICs) that are found in commercial off-the-shelf (COTS) wireless devices.

The PHY portion consists of the RF, mixed-signal and analog portions, often called transceivers, and the digital baseband portion of a radio platform. These portions place high demand on digital signal processing (DSP) and communication algorithm processing, including channel codes. These PHY portions may be integrated with the media access control (MAC) layer in System-on-a-Chip (SOC) implementations.

An instantiation of a PHY device connects a link layer device (often called a MAC) to a physical medium such as an optical fiber or copper cable.

Disclosed herein is a hybrid platform that integrates COTS wireless devices with FPGA-based SDRs. The hybrid platform benefits from the reuse of PHY/MAC implementations within a COTS ASIC to reduce development overhead and out-of-the-box compatibility with current wireless standards. In the disclosed hybrid platform, the COTS device connects to the SDR by way of an antenna port and may be swapped easily for a different COTS device to maintain compatibility with different types of wireless protocols. In an embodiment, the hybrid platform occupies about half the number of FPGA logic slices as the current WARP OFDM Reference design and still can communicate with other COTS devices. The WARP OFDM Reference design refers to a FPGA-based Wireless Open Access Research Platform (WARP) that implements an Orthogonal Frequency-Division Multiplexing (OFDM) modulation scheme. Thus, the hybrid platform leverages PHY/MAC implementations within a COTS device and saves the SDR resources (such as FPGA logic slices or CPU cycles) and development effort/time used for the PHY/MAC implementations. The saved resources and time can be used to implement more advanced features on top of what the COTS device originally provides. This simplifies the development of new SDR PHY protocols and speeds up the integration of new PHY technologies into current wireless devices and networks.

However, a "software" defined radio is a misnomer, since the PHY operations will always have some hardware components. One difference between different SDR platforms is the manner in which the actual radio and other processing components are combined.

The hybrid platform allows placement of the SDR at various locations within the overall wireless device architecture relative to the actual radio and other processing components. The various embodiments disclosed herein illustrate and describe architectural arrangements of the SDR and the other components (i.e., the actual radio and other processing components). However arranged, the embodiments will include an antenna, which is part of a RF frontend and a baseband processor of the COTS device and the SDR. In a radio receiver circuit, the RF frontend is a generic term for the circuitry between the antenna and the first intermediate frequency (IF) stage. The RF frontend includes the components in the receiver that process the signal at the original incoming radio frequency (RF), before the signal is converted to a lower intermediate frequency (IF). In a hardware implementation, the RF frontend digitizes and down-converts analog signals into baseband samples.

A baseband processor (also known as baseband radio processor, BP, or BBP) is a device (a chip or part of a chip) in a network interface that manages most of the radio functions. In a digital wireless system such as that used in a SDR, the digital data are considered baseband before they are modulated into a carrier frequency for over-the-air transmission. The baseband processor may use its own RAM and firmware.

The rationale of separating the baseband processor from the SDR includes: (1) radio performance: radio control functions (signal modulation, encoding, radio frequency shifting, etc.) are highly timing dependent, and require a real time operating system; (2) legal: some authorities (e.g. the U.S. Federal Communications Commission (FCC)) require that the entire software stack running on a device which communicates with the cellular network must be certified, and separating the baseband processor into a different component allows reusing the baseband processor of the COTS device without having to certify the full SDR; and (3) radio reliability: separating the baseband processor into a different component ensures proper radio operation while allowing application and operating system changes.

For example, most smart phones contain two processors. The phone's operating system, user interface, and applications will run on the main applications processor (AP), such as an ARM-based CPU. The actual phone radio communications and control software, however, are separated out and run on the baseband processor. The AP communicates to the baseband processor over a defined control link, such as a serial connection or via GPIO lines coming from the AP. The main reason for separating out the radio functionality into the baseband processor is because radio control functions (signal modulation, encoding, radio frequency shifting, etc.) are highly timing dependent. The only practical way to run these functions on the main CPU is if the phone is running a real time operating system (OS). Another benefit of utilizing a baseband processor is that once designed and certified, the baseband processor should function properly regardless of application and OS changes. Also, the FCC requires that the entire software stack running on a device which communicates with the cellular network be certified. Since the AP is considered a separate device from the baseband processor (which creates the radio signals), phone designers may be more free in designing the phone's user interface and applications.

The herein disclosed hybrid SDR platform addresses and solves two technical problems that heretofore have prevented the effective combination of a SDR with COTS devices. The first technical problem relates to transmit/receive (Tx/Rx) distortion that occurs in certain possible SDR designs, which are described later in this disclosure. For example, in a synchronous SDR design (see as an example, FIG. 1), the SDR simultaneously receives signals from the COTS device and transmits signals to the RF frontend, and vice versa. Due to the proximity of the transmit (Tx) and receive (Rx) processing chains of the SDR, transmitted signals will be detected by the SDR's Rx processing chain and received signals by the SDR's Tx processing chain. The result is a feedback loop and consequent signal distortion. A purely asynchronous design (see as an example, FIG. 3) may not experience this distortion because no transmission between the SDR and the COTS device is involved.

The second technical problem that has plagued attempts to couple SDRs and COTS devices is synchronization. To couple a SDR to a COTS device, all signals entering the SDR have to be processed properly to eliminate distortions between the RF frontend and the SDR, and the SDR and the baseband processor.

Figure 5:
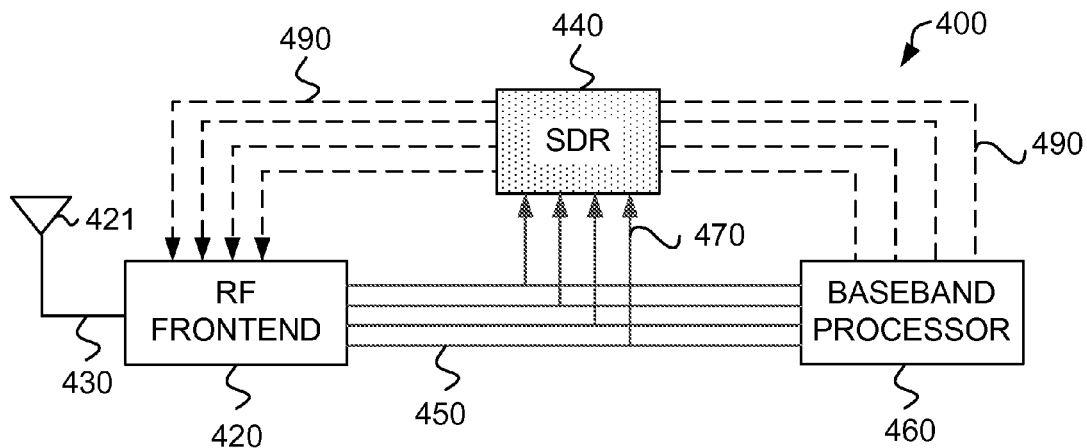
Figure 6:
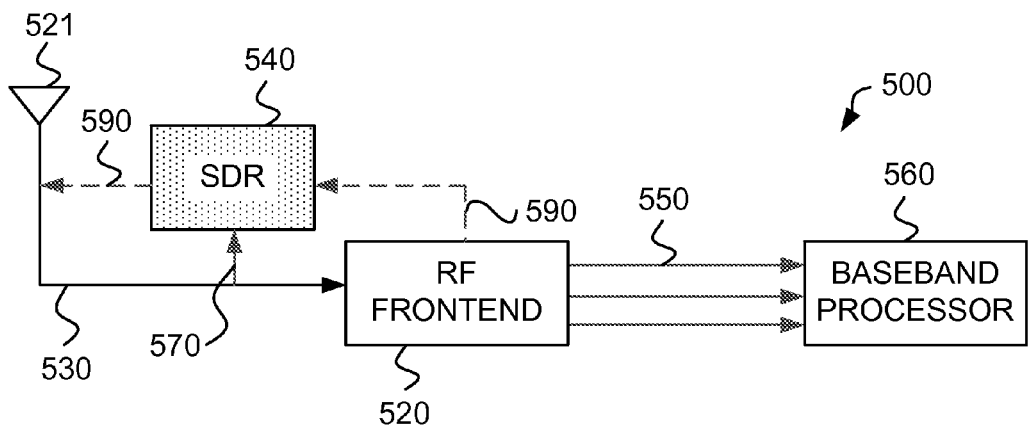
Figure 8:
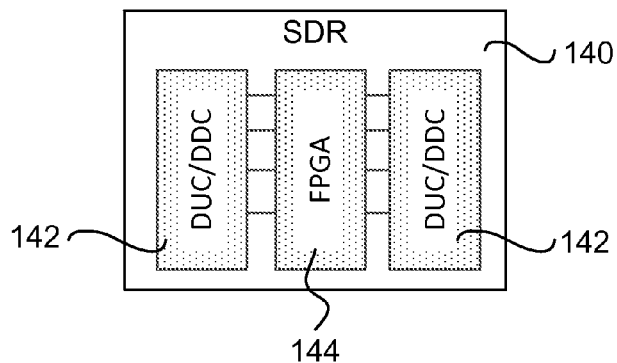
FIGS. 7 and 8 illustrate embodiments of a software defined radio as instantiated on one or more of the embodiments of FIGS. 1-6.
Figure 7:
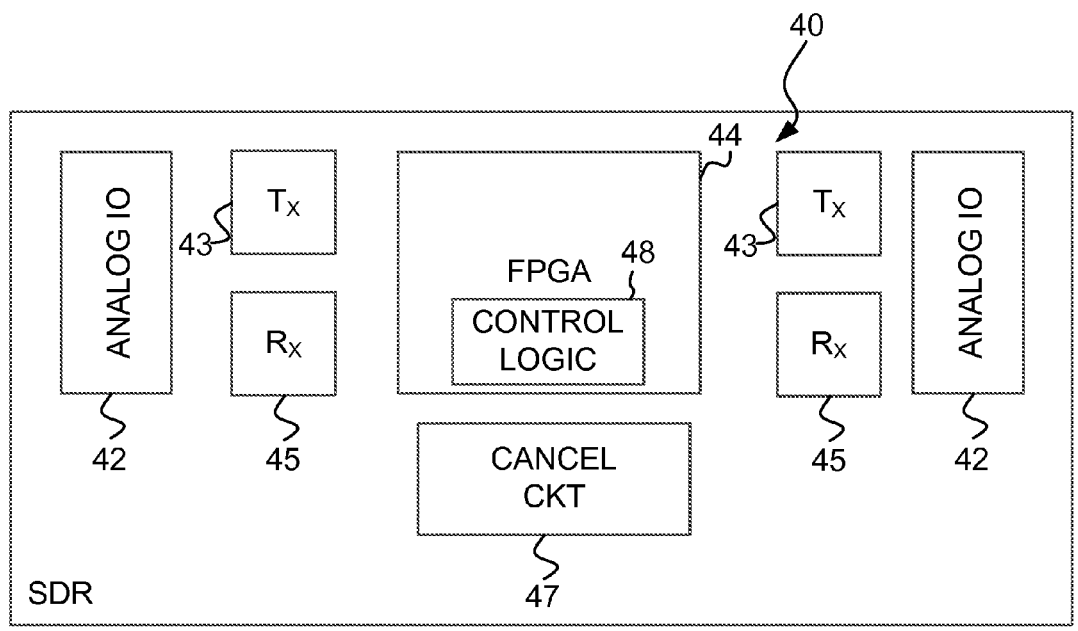

FIGS. 1-6 illustrate three hybrid platforms embodiments that integrate COTS wireless devices (i.e., ASICs) with FPGA-based SDRs, and FIGS. 7 and 8 illustrate SDRs that may be incorporated into these hybrid platforms. The combination of SDRs and COTS devices as shown in FIGS. 1-8, and as described in detail below, solve the technical problems mentioned immediately above. These platform embodiments take advantage of existing PHY/MAC implementations in the COTS devices to reduce deployment overhead and to obtain out-of-the-box compatibility of the COTS devices with current wireless protocols.

FIG. 1 illustrates an embodiment of a hybrid platform for a SDR, where the SDR is located between the baseband processor and the RF frontend. In FIG. 1, synchronous hybrid platform 10 includes SDR 40, which is located between baseband processor 60 and RF frontend 20. The RF frontend 20 includes an antenna 21, which provides a received signal over bi-directional signal path 30 to an RF down converter (not shown), which filters, amplifies, and frequency down converts the RF signal to a baseband signal. The baseband signal is provided over bi-directional signal path 50 through SDR 40 to baseband processor 60, where an analog to digital converter (or other sampling device)(not shown) converts the baseband signal into digital samples. The baseband processor 60 operates in accordance with a particular sampling frequency, and such operation may be in real time. Typically, the sampling frequency of this COTS device is fixed.

At an output of the SDR 40, digital-to-analog converters (not shown) are used to generate an analog signal for transmission by the RF frontend 20.

Thus, the SDR 40 used in the platform embodiment 10 of FIG. 1 will process signals at a same rate as the baseband processor 60; i.e., a synchronous design. This processing feature may restrict the choices of SDRs to FPGA-based designs, or other designs, that have sufficiently high clock speeds to match that of the baseband processor 60 (i.e., that of the COTS device). SDRs that require a software driver running on a host PC, for example, may not be suitable for use with the hybrid platform 10.

Figure 2:
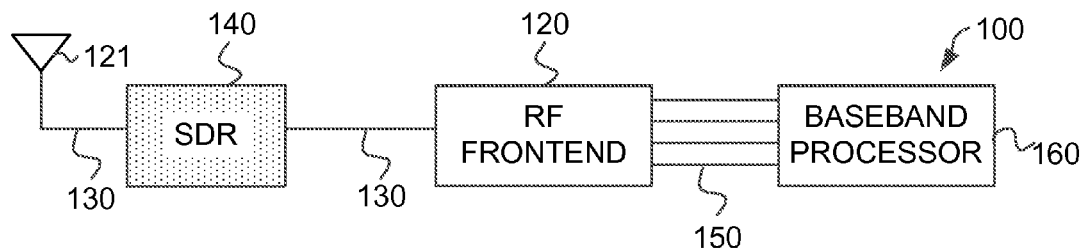

FIG. 2 illustrates an alternative embodiment of a hybrid platform that supports synchronous operation of the SDR. In FIG. 2, hybrid platform 100 includes SDR 140 located between RF frontend 120 and antenna 121. Bi-directional signal path 130 is formed between antenna 121 and SDR 140, and between SDR 140 and RF frontend 120. Baseband processor 160 communicates directly with RF frontend 120 over bi-directional signal path 150. With hybrid platform 100, the SDR 140 does not require direct access to bus signals between the RF frontend 120 and the baseband processor 160. However, the SDR 140 used in this embodiment will process signals at the same rate as the baseband processor 160. This processing feature may restrict the choices of SDRs to FPGA-based designs that have sufficiently high clock speeds to match that of the baseband processor 160 (i.e., to the COTS device). SDRs that require a software driver running on a host PC may not be suitable for use with the hybrid platform 100.

The hybrid platforms 10 and 100 of FIGS. 1 and 2, respectively, provide synchronous SDR operations that reap the benefits of incorporating current ASIC designs with SDRs so as to utilize existing wireless protocols. However, without a properly designed and implemented SDR, the platforms 10 and 100 may experience Tx/Rx distortion and synchronization problems. These aspects of the platforms 10 and 100 are described with respect to FIGS. 7 and 8.

Figure 3:
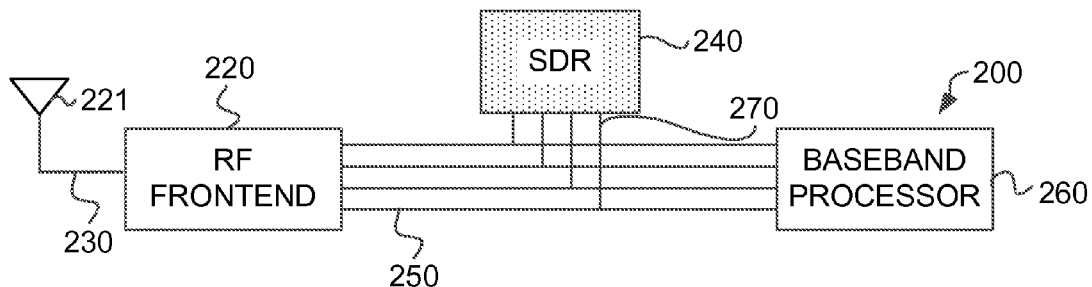
Figure 4:
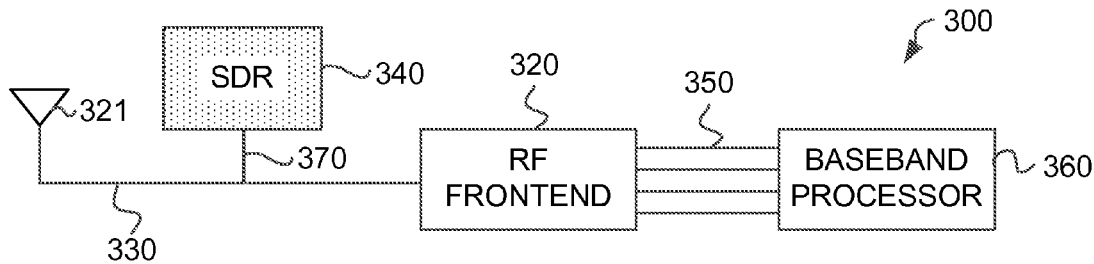

FIGS. 3 and 4 illustrate additional embodiments of a hybrid platform for a SDR. In FIGS. 3 and 4, the hybrid platform supports asynchronous operation of the SDR. The asynchronous operation of the SDR is made possible since the SDR is no longer placed on the time critical signal path between the antenna and the baseband processor. In FIG. 3, platform 200 includes antenna 221 in communication with RF frontend over signal path 230, and baseband processor 260 in communication with RF frontend 220 over bi-directional signal path 250. SDR 240 is located outside the signal path 250, and is in communication with the RF frontend 220 and the baseband processor 260 over signal path 270. Thus, the platform 200 provides for asynchronous processing by the SDR, meaning the SDR 240 may process data at a rate that is different (e.g., lower: at a sub-Nyquist sampling rate, for example) than the processing speed of the baseband processor 260. That is, asynchronous operation of the SDR 240 is made possible since the SDR 240 is not placed on the time critical path 250. Hence, the SDR 240 does not need to process in-phase/quadrature (I/Q) samples at a rate that meets the real time communications constraints of a real-world PHY/MAC protocol.

Furthermore, the SDR 240 processes only received signals, and not transmitted signals. Thus, the embodiment shown in FIG. 3 does not experience Tx/Rx distortion.

FIG. 4 illustrates a platform embodiment 300 that is similar to that of FIG. 3, except that SDR 340 is placed between antenna 321 and RF frontend 320, but is placed off the time critical path 330. Instead, the SDR 340 connects to the RF frontend 320 over signal path 370.

The platform embodiments 200 and 300, just as with the platforms 10 and 100, benefit form incorporating existing COTS devices with a SDR. The platforms 200 and 300 may be ideal for the low powered SDRs or SDRs that cannot keep up with the high signal throughput between the RF frontend and the baseband processor. For example, SDRs 240 and 340 may connect to baseband processor 260, 360, respectively using a BasicRx daughterboard. However, the platforms 200 and 300 still would suffer for synchronous distortion problems without the addition of a properly designed and implemented SDR, such as those shown in FIGS. 7 and 8.

Finally, the asynchornicity in the platforms 200 and 300 may suit SDR applications that are too complex for FPGA implementation, but have software implementations that are too slow for real-time operation. An aspect of these platforms is that component reuse and interoperability requirements are automatically achieved since the SDR does not modify any transmitted or received signal.

FIGS. 5 and 6 illustrate additional embodiments of hybrid platforms for SDRs. The illustrated embodiments support partially-synchronous operation of a SDR. In FIG. 5, platform 400 includes antenna 421 coupled to RF frontend 420 through bi-directional signal path 430. RF frontend 420 connects to broadband processor 460 by receive signal path 450 and to baseband processor 460 by transmit signal path 490. SDR 440 is positioned in signal path 490 but is positioned off receive signal path 450 by signal path 470. Thus SDR 440 may obtain receive baseband I/Q samples from the RF frontend 420 to the baseband processor 460 at a sub-Nyquist rate. On the other hand, the SDR 440 is located on the critical transmit path 490 for signals from the baseband processor 460 to the RF frontend 420. This architectural feature of the platform 400 takes advantage of the fact that it is easier to apply PHY level modifications to the transmitted signal than it is to the received signal because the transmitted signal does not suffer from channel and significant hardware distortions, while complicated synchronization and recovery algorithms may need to be applied to the received waveform.

FIG. 6 illustrates yet another embodiment of a hybrid platform for a SDR. In FIG. 6, platform 500 is similar to that of FIG. 5, except that SDR 540 is located in transmit path 590 between RF frontend 520 and antenna 521 and off bi-directional signal path 530, using signal path 570. The RF frontend 520 communicates with baseband processor 560 using bi-directional signal path 550.

FIG. 7 illustrates an embodiment of a SDR that may be incorporated in the platforms 10, 200, and 400. In FIG. 7, SDR 40 includes FPGA 44, which connects to analog input/output (I/O) devices 42. One I/O device 42 connects to the baseband processor and the other connects to the RF frontend. The FPGA ASIC in SDR 40 controls data processing on the SDR 40.

The FPGA 44 may include control logic 48. The control logic 48 may at least operate to minimize or eliminate Tx/Rx distortion, where applicable, and distortion due to coupling a SDR and a COTS device.

The SDR 40 further includes transmit (Tx) processing chains 43, receive (Rx) processing chains 45, and a cancellation circuit 47. The processing chains 43 and 45 operate to process signals into and out of the SDR 40. The cancellation circuit 47 may be an analog device that cancels or mitigates Tx distortion at the Rx input As noted above, one form of distortion may be caused by feedback between the Tx and Rx processing chains. The control logic 48, in an embodiment, addresses this form of distortion by alternating processing between the Rx and Tx chains so that no feedback occurs. In another embodiment, the control logic 48 maintains the Rx chains 45 in an always on state and switches or toggles the Tx chains 43 between On and Off. In this embodiment, with the Rx chain 45 always On, the received signals are ignored when the Tx chains 43 is on and processing signals. In one alternative of this embodiment, the Tx and Rx chains are separate radios.

Finally, the control logic 48 operates to determine a protocol of the baseband processor and the RF frontend, and to adapt the protocol of the SDR (the FPGA 44) to match that of the baseband processor (i.e., the COTS device). The SDR 40 is capable of operating according to one of several wireless protocols. By matching protocols, the control logic 48 minimizes distortion that might exist because of connections between the SDR 40 and the COTS devices.

The cancellation circuit 47 may be implemented apart from the FPGA 44 as shown in FIG. 7, or may be incorporated into the FPGA 44.

FIG. 8 illustrates an alternate embodiment of a SDR that may be incorporated in the platforms 100, 300, and 500. In FIG. 8, SDR 140 includes FPGA 140 and two digital up/down converters (DUC/DDC). FPGA 140 provides central processing functions for the SDR 140. Although not shown in FIG. 8, the SDR 140 may incorporate the same transmit/receive chains, control logic, and cancellation circuitry as shown in FIG. 7.

We claim:

1. A hybrid platform comprising:
   a receive/transmit antenna;
   a radio frequency (RF) frontend;
   a baseband processor; and
   a software defined radio (SDR) positioned along a signal path that couples the antenna, the RF frontend, and the baseband processor, wherein the SDR comprises:
   a transmit processing chain to toggle between on and off states,
   a receive processing chain to operate in an always on state during operation of the SDR, wherein received signals are ignored when the transmit processing chain is on, and
   a FPGA having control logic to control the transmit processing chain toggling between on an off states and the receive processing chain ignoring received signals when the transmit processing chain is on.

2. The platform of claim 1, wherein:
   the signal path is a bi-directional signal path, and
   the SDR is to process signals on the bi-directional signal path at a same rate as the baseband processor.

3. The platform of claim 2, wherein the SDR is positioned between the antenna and the RF frontend.

4. The platform of claim 1, wherein the SDR is positioned between the RF frontend and the baseband processor.

5. The platform of claim 1, wherein the SDR is to process signals off the signal path at a rate different from a processing rate of the baseband processor.

6. The platform of claim 5, wherein the SDR is positioned off the signal path between the RF frontend and the baseband processor.

7. The platform of claim 5, wherein the SDR is positioned off the signal path between the antenna and the RF frontend.

8. The platform of claim 1, wherein the signal path comprises a receive signal path and a transmit signal path, and wherein the SDR is coupled between the RF frontend and the antenna on the transmit signal path.

9. The platform of claim 1, wherein the control logic is to determine a synchronization protocol of the baseband processor and switch a protocol of the SDR to match the determined protocol.

10. A hybrid platform comprising:
 a transmit/receive antenna coupled to a commercial off the shelf (COTS) radio frequency (RF) frontend;
 a COTS baseband processor coupled to the COTS RF frontend along a signal path; and
 a software defined radio (SDR) to process signals transmitted and received over the signal path, wherein the SDR comprises:
  a transmit processing section,
  a receive processing section, and
  control logic, comprising:
   programmable switch logic to maintain the receive signal processing section in an always on state during operation of the SDR, and to toggle the transmit processing section between on and off states; and
   synchronization logic to determine a synchronization protocol of the COTS baseband processor and set a protocol of the SDR to match the determined protocol.

11. The platform of claim 10, wherein the SDR is coupled on the signal path between the COTS RF frontend and the COTS baseband processor.

12. A hybrid platform comprising:
 commercial off the shelf (COTS) devices for RF and baseband processing; and
 a software defined radio (SDR) coupling the COTS devices, wherein the SDR comprises:
  a transmit processing chain,
  a receive processing chain, and
  control logic to cancel an effect of transmit processing on receive processing and receive processing on transmit processing, wherein the receive processing chain is always on during operation of the SDR, and the transmit processing chain toggles between on and off.

* * * * *